(12) United States Patent
Yagi et al.

(10) Patent No.: US 8,481,719 B2
(45) Date of Patent: Jul. 9, 2013

(54) METHOD OF MANUFACTURING GEL USING POLYSACCHARIDES AS RAW MATERIALS

(75) Inventors: Toshiaki Yagi, Takasaki (JP); Naotsugu Nagasawa, Takasaki (JP); Akihiro Hiroki, Takasaki (JP); Masao Tamada, Takasaki (JP); Charito T. Aranilla, Quezon (PH)

(73) Assignee: Japan Atomic Energy Agency, Ibaraki (JP)

( * ) Notice: Subject to any disclaimer, the term of this patent is extended or adjusted under 35 U.S.C. 154(b) by 266 days.

(21) Appl. No.: 12/861,417

(22) Filed: Aug. 23, 2010

(65) Prior Publication Data

US 2010/0314580 A1 Dec. 16, 2010

Related U.S. Application Data

(62) Division of application No. 11/950,036, filed on Dec. 4, 2007.

(30) Foreign Application Priority Data

Dec. 8, 2006 (JP) ................................. 2006-331679

(51) Int. Cl.
*C08B 37/00* (2006.01)
*A23L 1/025* (2006.01)
*A23L 1/0526* (2006.01)

(52) U.S. Cl.
USPC .......................................... 536/124; 536/114

(58) Field of Classification Search
USPC ................................................... 536/114, 124
See application file for complete search history.

(56) References Cited

U.S. PATENT DOCUMENTS 5,612,411 A * 3/1997 Gross ........................... 525/54.3
6,610,810 B2 * 8/2003 Phillips et al. ................ 527/201

FOREIGN PATENT DOCUMENTS

JP 2001-002703 1/2001

OTHER PUBLICATIONS machine translation of JP 2001002703 A, http://dossier1.ipdl.inpit.go.jp/, accessed online on Aug. 7, 2012.*
Bruck et al., J. Biomed. Mater. Res.: Applied Biomaterials, 1988, 22(A2), p. 133-144.*

* cited by examiner

*Primary Examiner* — Shaojia Anna Jiang
*Assistant Examiner* — Jonathan S Lau
(74) *Attorney, Agent, or Firm* — Mattingly & Malur, PC

(57) ABSTRACT

After adding water to the carboxymethyl carrageenan which is raw material and mixing them well, the ionizing radiation of more than fixed dose is irradiated to the obtained paste sample of fixed concentration. As a result, an excellent hydrogel in heat resistance which does not dissolve at 50° C. or more can be obtained. The manufactured gel can be used for many kinds of products. Because this gel has a biodegradation characteristic, it is possible to dispose by composting.

2 Claims, 3 Drawing Sheets

| CARBOXYMETHYL CARRAGEENAN CONCENTRATION (%) | 30 | 40 |
|---|---|---|
| GEL FRACTION (%) | 30.5 | 35.5 |
| WATER ABSORPTION (g WATER / 1g DRIED GEL) | 71 | 69 |

| CARBOXYMETHYL CARRAGEENAN CONCENTRATION (%) | 20 | 30 | 40 |
|---|---|---|---|
| GEL FRACTION (%) | 59.1 | 67.8 | 73.7 |
| WATER ABSORPTION (g WATER / 1g DRIED GEL) | 97 | 42 | 22 |

METHOD OF MANUFACTURING GEL USING POLYSACCHARIDES AS RAW MATERIALS

CROSS-REFERENCES

This application is a divisional application of U.S. Ser. No. 11/950,036, Dec. 4, 2007. The entire disclosure of the above-identified application is hereby incorporated by reference.

BACKGROUND OF THE INVENTION

1. Field of the Invention

The present invention relates to a method of manufacturing a biodegradable and water-absorbing polymer gel, which uses carboxymethyl carrageenan as raw materials. In particular, the present invention relates to a method of manufacturing a water-absorbing polymer gel obtained by irradiating ionizing radiation after mixing carboxymethyl carrageenan with water.

2. Prior Art

As for the hydrogel, it is known that it can be obtained by causing the radiation crosslinking by irradiating ionizing radiation to the aqueous solution of polyethylene oxide, polyvinyl alcohol, polyacrylamide, and polyvinylpyrrolidone etc. The hydrogel obtained thus is used as moisture retention materials and hygienic articles such as a disposable diaper etc. in the field of the medical treatment and cosmetics because a significant amount of water can be absorbed and contained. The material used for these articles is chiefly sodium polyacrylate.

A method of preparing a hydrogel by irradiating the ionizing radiation to an aqueous solution of carboxymethylated polymers has been disclosed, for instance, in JP 2001-2703 A1.

BRIEF SUMMARY OF THE INVENTION

As described above, the water absorbing gel obtained by radiation crosslinking of water-soluble polymers such as sodium polyacrylate, etc. is used for hygiene articles such as a disposable diaper, etc. widely. The disposable diaper used in a home or a hospital are disposed of by the incineration processing. However, the combustion temperature decreases when the wet diapers are put in the incinerator, resulting in the generation of dioxin and the increase in carbon dioxide. They are not decomposed in the underground disposal, and stay in the soil for a long period. As a result, the environment load may be increased. Therefore, in order to decrease the environment load the application of the hydrogels such as sodium polyaspartate and sodium polyglutamate decomposed in the soil is attempted.

There is a method of synthesizing the water absorbing material by chemical crosslinking natural materials such as starch and cellulose, in which the reagent such as formalin, glutaraldehyde, and epichlorohydrin is used. However, because these chemical substances are toxic, there are problems on environmental pollution in a work site and residual contamination in water absorbing materials. A safe crosslinking technique is required, because aldehyde pollutes the work environment and residual aldehyde may occasionally stimulate the skin in this method.

Therefore, the water absorbing materials which reduce the environment load are required. Especially, biodegradable polymers which are decomposed and digested by the microorganism in the soil and are easy to process after use are remarked as a low environmental load material. If a collection system after use can be constructed, biodegradable and water-absorbing materials become recyclable material which can be used as resources because it can be disposed as fertilizer by composting.

An object of the present invention is to provide a method of manufacturing a gel in which the gel can be manufactured cheaply using high water-absorbing polymers as raw materials, which is decomposed and digested by the microorganism in the soil.

The inventors carried out hard research from the above-mentioned viewpoint. As a result, when the radiation was irradiated to a high concentrated paste of the synthesized carboxymethyl carrageenan, it was found out that the crosslinking of carboxymethyl carrageenan is occurred. Carrageenans are well-known material. For example, San-Ei Gen F.F.I. Inc. whose head office is in Osaka City is supplying to the market as gelatinizer for food.

It is difficult to form the gel by radiation-induced crosslinking with carboxymethyl carrageenan in a state of the solid or the low concentrated solution (10% or less), because decomposition occurs first in polymer chain. In the present invention, it became possible to crosslink by adding water to carboxymethyl carrageenan, kneading well to make paste of constant concentration (10% or more), and irradiating the ionizing radiation.

The hydrogel of carboxymethyl carrageenan manufactured based on the present invention is basically synthesized as follows. After adding water to the carboxymethyl carrageenan and mixing them, the ionizing radiation of more than fixed dose is irradiated to the obtained paste sample of a certain concentration. As a result, an excellent hydrogel in heat resistance which does not dissolve at 50° C. or more can be obtained.

More concretely, carboxymethyl carrageenan is mixed with water well to obtain a high concentrated sample of paste-state. This is put in the bag made of the laminated product of polyethylene and nylon. The heat seal is provided after vacuum deaeration, and gamma-rays are irradiated. Although this paste is soft before irradiation, the paste becomes rubbery by the gamma-irradiation and thus an elastic gel is obtained. The concentration of the paste should be 10% or more to form the radiation crosslinking, preferably from 20% to 40%. The decomposition occurs first in the state of the solid or the density of 10% or less, and thus the formation of a gel by crosslinking is not observed.

Gamma-rays, electron beams, or X-ray can be used as the ionizing radiation and the dose of the crosslinking may be in the range of 0.1-1000 kGy. Although the desirable dose of crosslinking is 5 kGy or more, 20 kGy or more is the best. As for the ionizing radiation, the gamma-rays obtained from cobalt 60 or the electron beam caused by an accelerator is desirable because of the industrial production. As for an electron accelerator, a high-energy electron accelerator of middle energy to high energy of acceleration voltage 1 MeV or more which can irradiate thick materials is the most desirable. If the sample before irradiation is worked like a film by pressure, the gel can be obtained by the radiation crosslinking even with a low energy electron accelerator of 1 MeV or less because the electron beam penetrates. Although the influence on crosslinking with oxygen under irradiation is little, it is preferable to cover the upper surface of the paste with a plastic film etc. such as polyester and to irradiate it in order to control the evaporation prevention of the moisture under irradiation and the decrease in crosslinking density.

The gel manufactured according to the present invention can be used for many kinds of products. Because this gel has a biodegradation characteristic, it is possible to dispose by composting. The environmental load does not increase

DETAILED DESCRIPTION OF THE INVENTION

A method of manufacturing a gel according to the present invention is explained more concretely hereinafter with reference to some embodiments and comparative examples. Each of these embodiments was basically performed at room temperature under the atmospheric pressure. Further, the present invention is not limited only to these embodiments.

Comparative Example 1

The carboxymethyl carrageenan used in comparative example 1 is the carrageenan carboxymethylated by using a conventional method. Namely, as one step, carrageenan was distributed to the mixed solution of 40% sodium hydroxide solution/isopropyl alcohol, reacted at 40° C. for 3 hours by adding monochloroacetic acid, filtered after neutralization, and dried. Gamma-ray of 0 to 100 kGy was irradiated to the less than 10% of carboxymethyl carrageenan aqueous solution and the carboxymethyl carrageenan of a solid-state at room temperature. Although molecular weight decreases as a result, the carboxymethyl carrageenan came to dissolve to water easily. However, water insoluble gel components were not formed. Accordingly, it can be estimated that crosslinking has not been formed in such a condition.

Embodiment 1

Figures 1, 2, 3:
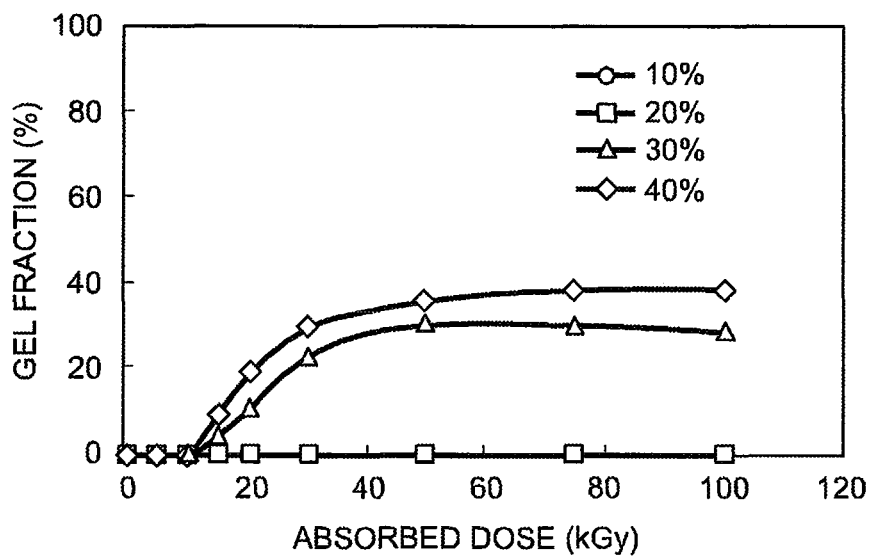
FIG. 1 shows the relationship between gel fraction and water absorption when gamma-ray of 50 kGy is irradiated to carboxymethyl carrageenan solution of various concentration to which one cycle process is performed.
FIG. 2 shows the relationship between gel fraction and water absorption when gamma-ray of 50 kGy is irradiated to carboxymethyl carrageenan solution of various concentration to which three cycle processes are performed.
FIG. 3 shows gel fraction when gamma-ray of 0-100 kGy is irradiated to carboxymethyl carrageenan of different concentration to which one cycle process is performed.

Embodiment 1 is explained referring to FIG. 1. FIG. 1 shows the relationship between gel fraction and water absorption when gamma-rays of 50 kGy are irradiated to carboxymethyl carrageenan solutions of various concentration to which one cycle process was performed. The 30% and 40% of samples of paste-state were made by kneading well the carboxymethyl carrageenan used in comparative example 1 with water, and gamma-rays of 50 kGy were irradiated. As understood clearly from FIG. 1, the crosslinking occurred to the carboxymethyl carrageenan by gamma-irradiation, and water insoluble gels were formed. Then, the water-absorbing hydrogels was obtained by soaking the gel to a large amount of water.

For the irradiation of gamma-rays of 50 kGy, when the concentration of the carboxymethyl carrageenan is 30%, the gel fraction was 30.5% and the water absorption of the obtained gel was 71 (g water/1 g dry gel). When the concentration of the carboxymethyl carrageenan is 40%, the gel fraction was 35.5%, and the water absorption of the obtained gel was 69 (g water/1 g dry gel).

Embodiment 2

Embodiment 2 is explained referring to FIG. 2. FIG. 2 shows the relationship between gel fraction and water absorption when gamma-ray of 50 kGy is irradiated to carboxymethyl carrageenan solutions of various concentration to which three cycle processes are performed. As for the carboxymethyl carrageenan used in embodiment 2, the reaction with monochloroacetic acid was carried out at 40° C. for 3 hours in the alkali environment (1 cycle). The carrageenan was carboxylated by repeating this cycle three times (3 cycles). The degree of substitution of the carboxymethyl group on carrageenan has increased more than that in embodiment 1. The 20%, 30%, and 40% of samples of paste-state were made by kneading well the carboxymethyl carrageenan used in comparative example 1 with water, and gamma-rays of 50 kGy were irradiated. As understood clearly from FIG. 2, the crosslinking occurred to the polymer of the carboxymethyl carrageenan by gamma-irradiation, and water insoluble gels were formed. Then, the water-absorbing absorbing hydrogel were obtained by soaking the gel to a large amount of water.

Comparative Example 2

The carboxymethyl carrageenan used in embodiment 2 of solid-state and less than 10% of aqueous solution were irradiated with gamma-rays of 0 to 100 kGy at room temperature. Although molecular weight decreases as a result, the carboxymethyl carrageenan came to dissolve to water easily. However, water insoluble gel components were not formed. Accordingly, it can be estimated that crosslinking has not been formed in such a condition.

For the irradiation of gamma-ray of 50 kGy, when the concentration of the carboxymethyl carrageenan is 20%, the gel fraction was 59.1% and the water absorption of the obtained gel was 91 (g water/1 g dry gel). When the concentration of the carboxymethyl carrageenan is 30%, the gel fraction was 67.8% and the water absorption of the obtained gel was 42 (g water/1 g dry gel). And, when the concentration of the carboxymethyl carrageenan is 40%, the gel fraction was 73.7%, and the water absorption of the obtained gel was 22 (g water/1 g dry gel).

Embodiment 3

Figure 4:
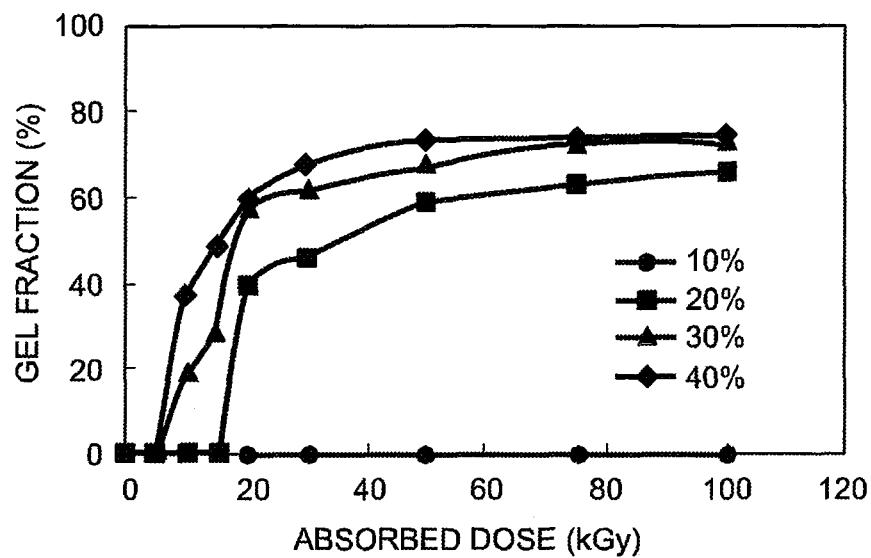
FIG. 4 shows gel fraction when gamma-ray of 0-100 kGy is irradiated to carboxymethyl carrageenan of various concentration to which three cycle processes are performed.
Figure 5:
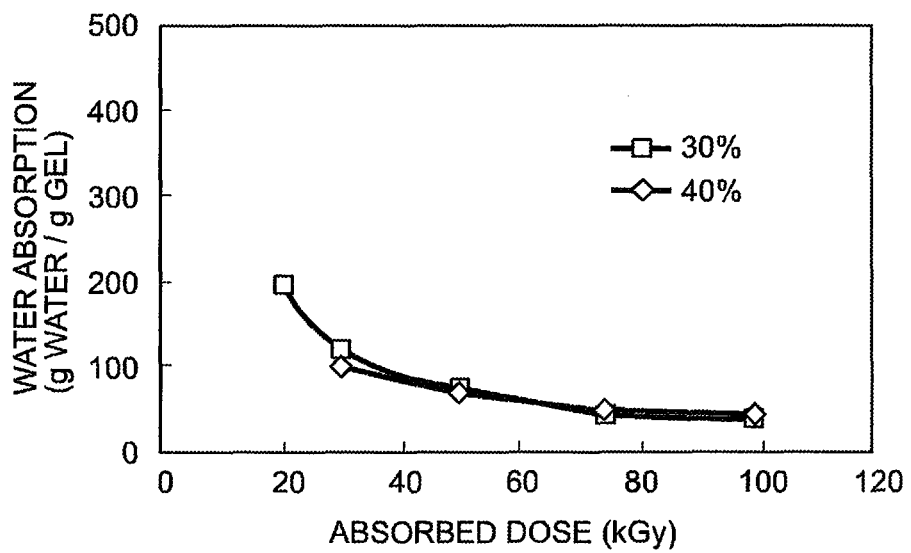
FIG. 5 shows water absorption when gamma-ray of 0-100 kGy is irradiated to carboxymethyl carrageenan of various concentration to which one cycle process is performed.
Figure 6:
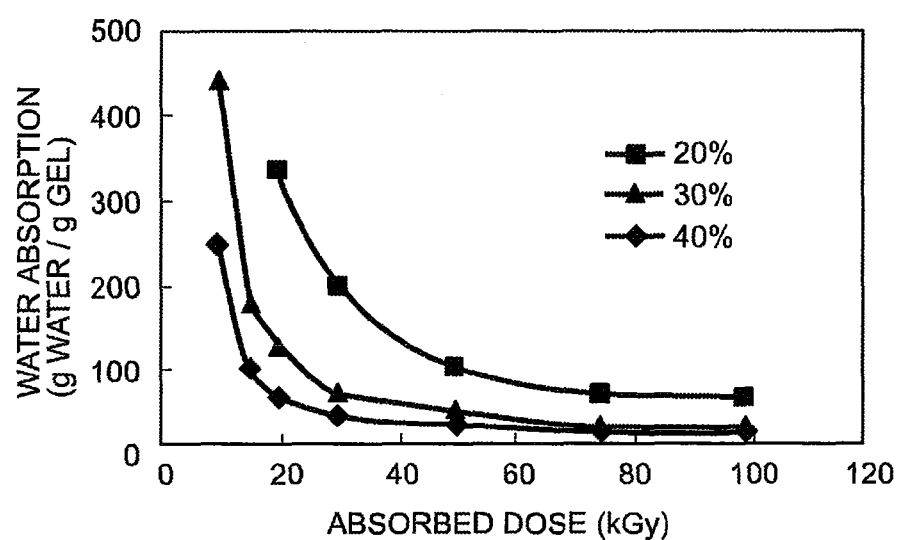
FIG. 6 shows gel fraction when gamma-ray of 0-100 kGy is irradiated to carboxymethyl carrageenan of various concentration to which three cycle processes are performed.

To investigate the properties of the carboxymethyl carrageenan gels more in detail, the inventors irradiate gamma-rays of 0-100 kGy to the paste samples of the concentration of 10%, 20%, 30% and 40% of carboxymethyl carrageenan, and examine gel fraction (%) and water absorption (g water/1 g dry gel) of each carboxymethyl carrageenan gels. The results are graphed in FIGS. 3 to 6. FIG. 3 shows gel fraction when gamma-rays from 0 to 100 kGy are irradiated to paste samples of various concentrations to which one cycle process is performed. FIG. 4 shows gel fraction when gamma-rays from 0 to 100 kGy are irradiated to paste samples of various concentrations to which three cycle processes are performed. FIG. 5 shows water absorption when gamma-rays from 0 to 100 kGy are irradiated to paste samples of various concentrations to which one cycle process is performed. And, FIG. 6 shows gel fraction when gamma-rays from 0 to 100 kGy are irradiated to paste samples of various concentrations to which three cycle processes are performed.

As understood from FIG. 3 and FIG. 4, the gel fraction increases rapidly between 5 kGy and 20 kGy, and it increases gradually after passing a critical point of 20 kGy. Further, as understood from FIG. 5 and FIG. 6, the water absorption decreases rapidly to the dose of about 30 kGy, and it decreases gradually after passing a critical point of about 30 kGy.

Because the experiments carried out in embodiment 3 have been performed also in embodiments 1, and 2, and comparative examples 1, and 2 under the same condition, the results of each embodiment and each comparative example are included in the result of embodiment 3. Moreover, in FIG. 4, only data measured with increase in the concentration of 10% is shown. Although it is, therefore, shown that as for carboxymethyl carrageenan to which three cycle processes are performed, the gel is not formed in the concentration of 10%, and it is formed for the first time in the density of 20%, it has been understood through sampling experiments that the gels with the gel fraction and water absorption for the practical use can be obtained in case of being between 15% and 60% of concentration.

Moreover, as for the evaluation of the gel manufactured according to the present invention, the gel fraction and water absorption are calculated as follows.

(1) Gel Fraction

The gel fraction is obtained as follows. The obtained gel after irradiation is freeze-dried, and dried in a 50° C. vacuum oven to constant weight. The dry sample is soaked in a large amount of water for 48 hours. A soluble component called a sol where the crosslinking is not formed is dissolved in water, and only a gel which is insoluble component is collected. After then, the gel is dried at 50° C. for 24 hours. The gel fraction is calculated by the following equation.

$$\text{Gel fraction (\%)} = (\text{gel weight excepted soluble components/initial dry weight}) \times 100$$

(2) Water Absorption

The water absorption is expressed by the amount of water absorbed by the dry gel of 1 g when the gel formed by irradiating the radiation to paste sample is dried and then the gel dried is soaked to a large amount of water at 25° C.

The gel manufactured as mentioned above can be used in various fields such as industry, agriculture, medical treatment, and food. Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments, which can be embodied within a scope encompassed and equivalent thereof with respect to the feature set out in the appended claims.

What is claimed is:

1. A method of manufacturing a hydrogel, comprising:
   providing carboxymethyl carrageenan which is raw material;
   adding water to the carboxymethyl carrageenan and mixing them to obtain paste sample in a concentration range of 15-60%; and
   irradiating the paste sample with at least 5 kGy or more of ionizing radiation to perform radiation crosslinking.

2. A method of manufacturing a hydrogel, comprising:
   providing carboxymethyl carrageenan which is raw material;
   adding water to the carboxymethyl carrageenan and mixing them to obtain paste sample in a concentration range of 15-60%; after that,
   performing vacuum deaeration;
   providing heat seal around the entire paste sample to limit a decrease in crosslinking density; and
   irradiating the paste sample with at least 5 kGy or more of ionizing radiation to perform radiation crosslinking.

* * * * *